Feb. 19, 1957    J. F. SKOLD    2,781,945
AUTOMATIC MULTIPLE CONVEYOR
Filed Nov. 7, 1955    5 Sheets-Sheet 1

INVENTOR
JOHN F. SKOLD
BY

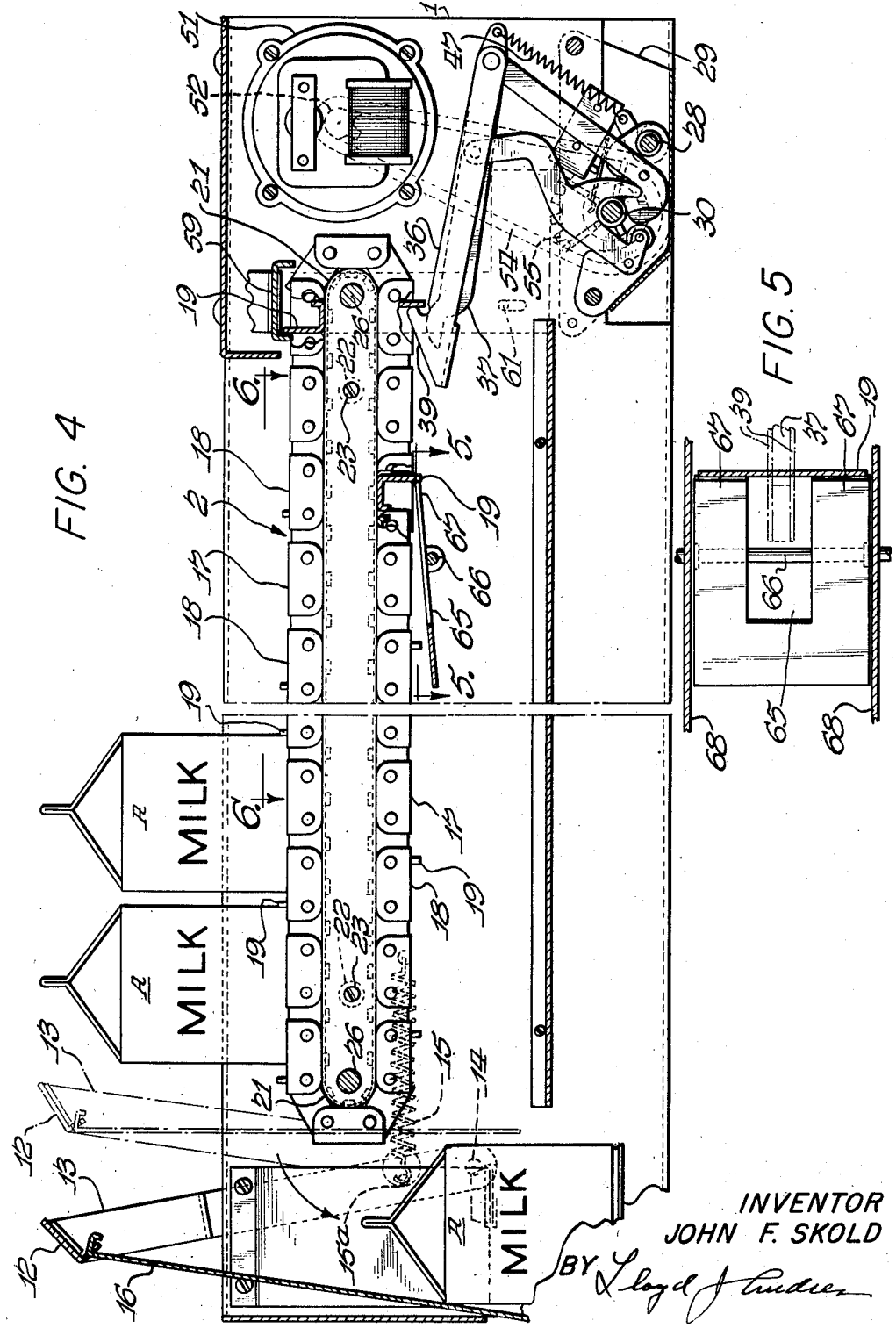

Feb. 19, 1957 — J. F. SKOLD — 2,781,945
AUTOMATIC MULTIPLE CONVEYOR
Filed Nov. 7, 1955 — 5 Sheets-Sheet 3
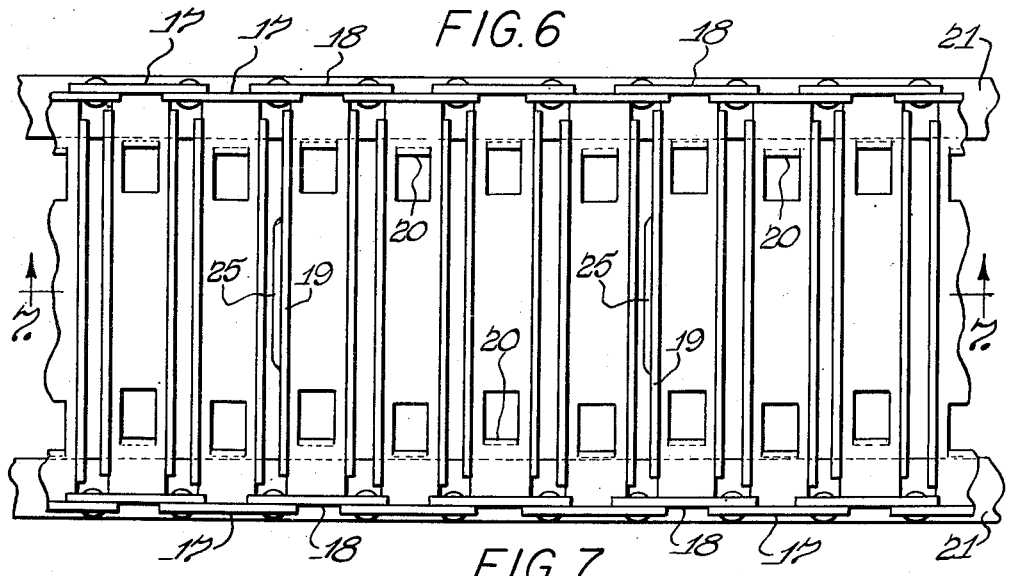
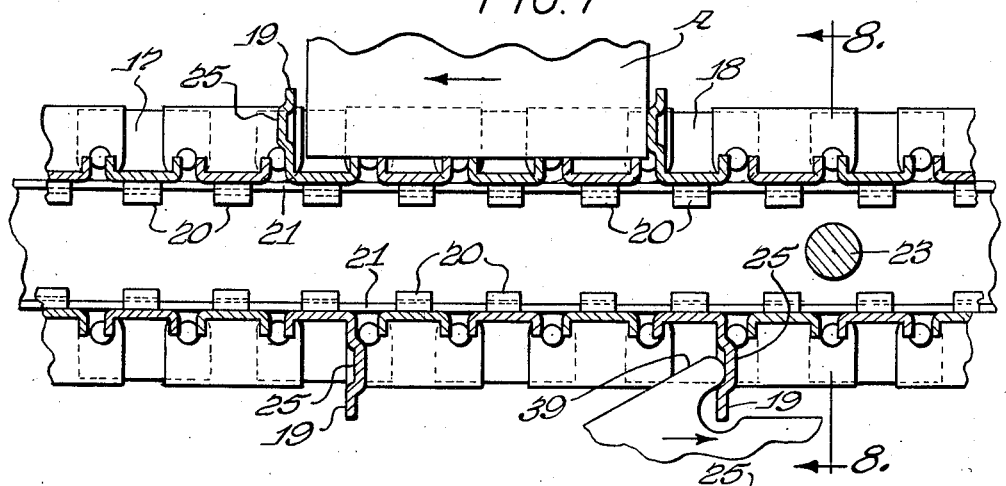
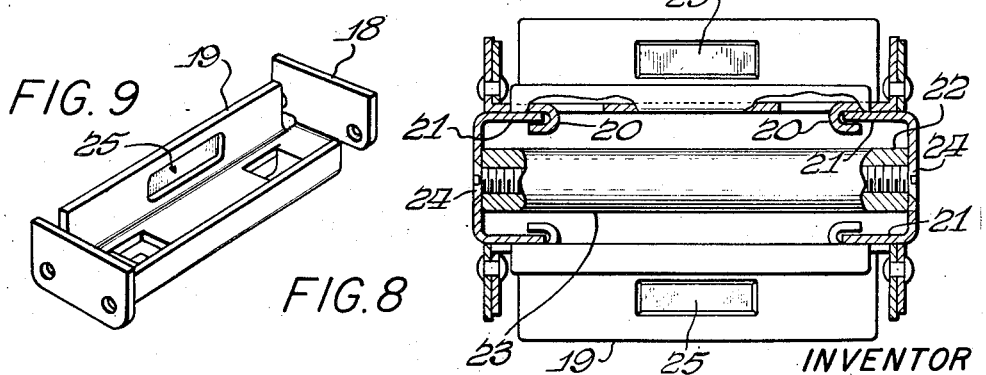
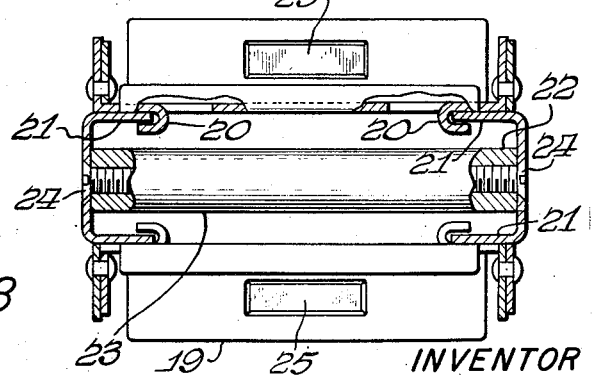
INVENTOR
JOHN F. SKOLD

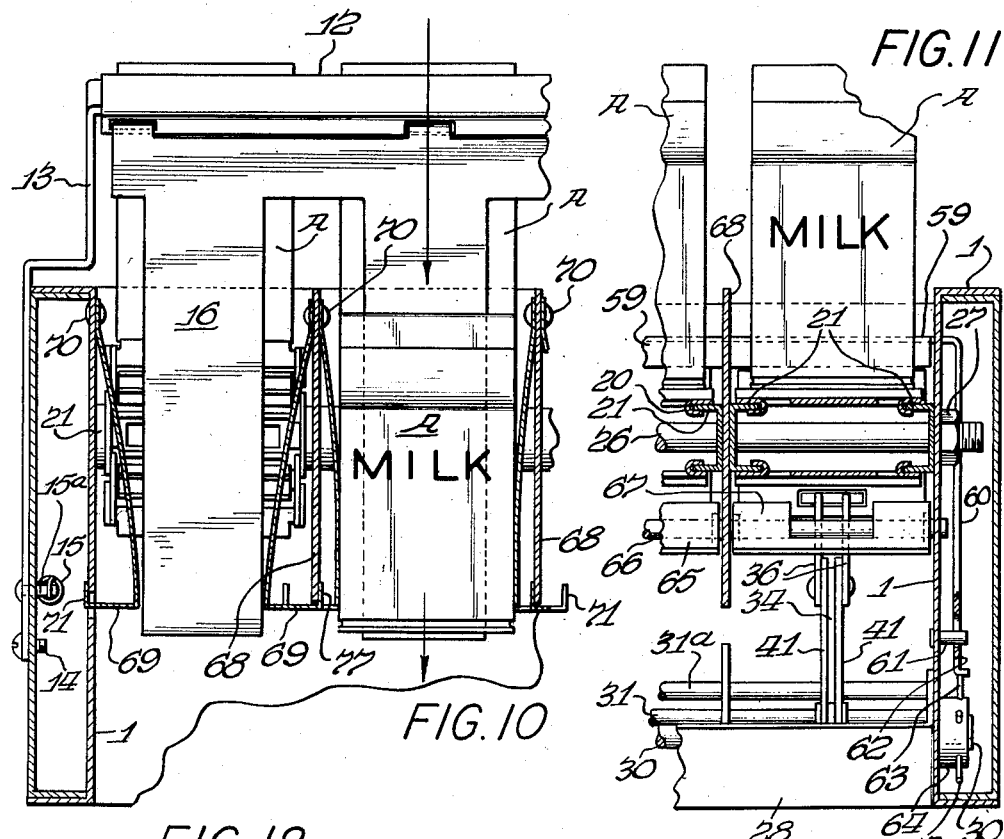
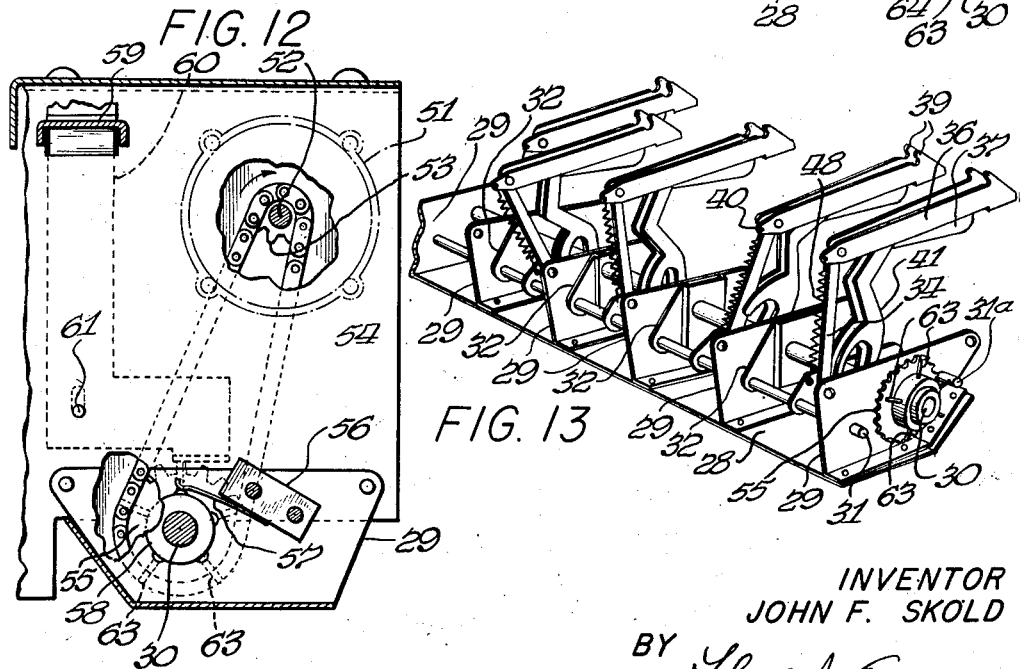
INVENTOR
JOHN F. SKOLD

Feb. 19, 1957 J. F. SKOLD 2,781,945
AUTOMATIC MULTIPLE CONVEYOR
Filed Nov. 7, 1955 5 Sheets-Sheet 5

INVENTOR
JOHN F. SKOLD

United States Patent Office 2,781,945
Patented Feb. 19, 1957

2,781,945

AUTOMATIC MULTIPLE CONVEYOR

John F. Skold, Chicago, Ill.

Application November 7, 1955, Serial No. 545,249

10 Claims. (Cl. 221—114)

This invention in general relates to mechanical conveyors and more particularly to an automatic multiple conveyor for sequentially transporting and dispensing objects or articles.

A multiple conveyor responsive to the rotation of a single shaft for sequentially delivering objects storaged thereon to a predetermined discharge position has long been sought by industry and although the conveyor hereinafter described is constructed for use in an all purpose vending machine, it will be apparent that the important features of its construction are applicable to a wide variety of uses.

A principal object of the conveyor is the provision of a plurality of parallel positioned endless link chain conveyors responsive to a transmission means whereby each conveyor is sequentially moved predetermined distances to sequentially displace and deposit a plurality of articles or objects stored on said conveyors when the transmission is operated.

A further object of the invention is the provision of a plurality of parallel spaced claws responsive to the rotation of a drive shaft for successively engaging and displacing a plurality of conveyor belts predetermined equal unit distances.

Another object of the invention is the provision of a plurality of interconnected links and a trackway therefor for forming an endless chain conveyor forming predetermined compartments therein for storing and transporting an article in each of said compartments.

A further object of the invention is the provision of a multiple of link chain conveyors for storing and sequentially delivering a plurality of articles from storage therein to a predetermined depository when operating, including automatic locking means for securing said conveyor in a stationary position when same is not in operation.

These and other objects and advantages in one embodiment of the invention are described and shown in the following specification and drawings in which:

Fig. 4 is an enlarged side elevation of the conveyor taken through section line 4—4 Fig. 2;

Fig. 5 is a fragmentary plan view taken through section line 5—5 Fig. 4;

Fig. 6 is a fragmentary plan view of the link conveyor taken through section line 6—6 Fig. 4;

Fig. 7 is a fragmentary side elevation of the link conveyor taken through section line 7—7 Fig. 6;

Fig. 8 is a fragmentary end view taken through section line 8—8 Fig. 7;

Fig. 9 is a perspective view of one master link of the chain conveyor shown Figs. 6, 7 and 8;

Fig. 10 is a fragmentary front view of the link conveyor taken through section line 10—10 Fig. 2;

Fig. 11 is a fragmentary front view taken through section line 11—11 Fig. 2;

Fig. 12 is a fragmentary cross sectional side view taken through section line 12—12 Fig. 2;

Fig. 13 is a perspective view of the multiple actuators for sequentially operating the link conveyors shown Figs. 2 and 7.

Figure 1:
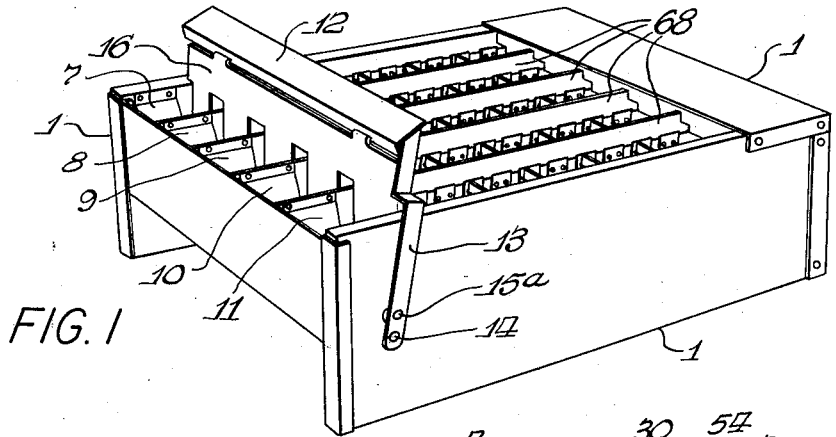
Fig. 1 is a perspective view of the multiple conveyor made in the form of a slidable drawer.

Referring to Fig. 1 the automatic multiple conveyor is mounted in a casing or frame assembly 1 constructed in the form of a drawer in which all operating mechanism is self-contained thus providing a convenient means for withdrawal and replacement for loading, particularly when the device is used in a vending machine, and when multiples of said drawers are superimposed above each other in a cabinet or refrigerator.

The particular embodiment described consists of five endless link chain conveyors positioned adjacent each other with an actuating mechanism positioned in the rear of the casing and five corresponding discharge passageways for the goods or objects "A" in the front of said casing.

Figure 2:
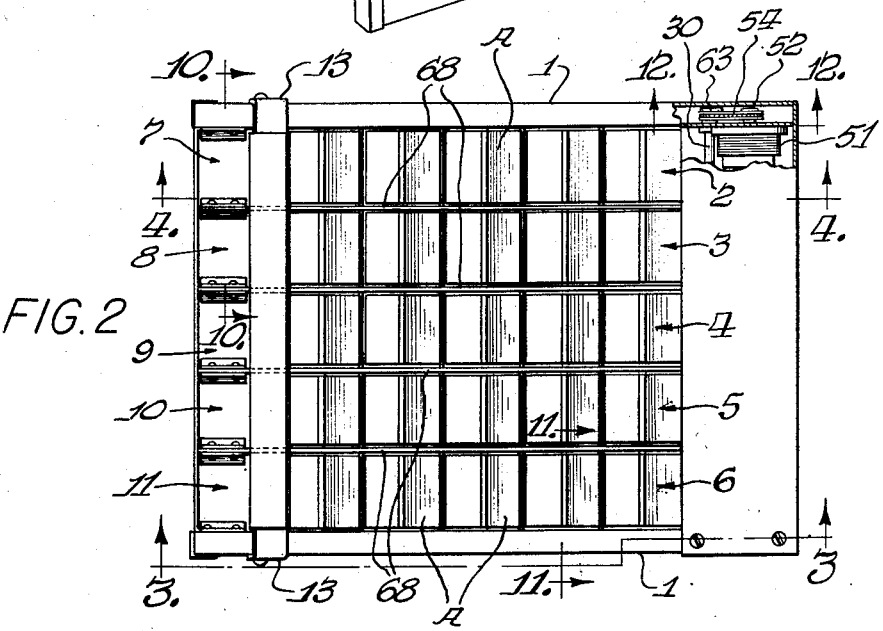
Fig. 2 is a plan view of the conveyor shown Fig. 1.

Referring to Fig. 2 each endless link conveyor 2, 3, 4, 5 and 6 are adapted to store five objects each, such as cartons of milk or other commodities of various shapes, as shown in Fig. 4.

It will be apparent in the following description that the mechanism is adapted to sequentially discharge by gravity said commodities in sequence through delivery passageways 7, 8, 9, 10 and 11 when operated. These passageways are adapted to coincide with a lower positioned delivery hopper not shown. When multiples of conveyor drawers are stacked one above the other the delivery passageways are intended to coincide with each other.

A deflector member 12 is secured to a yoke having arms 13—13 each of which is pivotly secured to opposite sides of casing 1 by screws 14. A spring 15 is secured to each arm 13 by stud 15a. The opposite ends of each spring is secured to casing 1, thus the yoke and deflector are normally urged rearward to the position shown Fig. 1 with studs 15a resting against the rear edge of clearance holes in casing 1. An apron 16 is hinged along its upper edge to deflector member 12 and normally rests in vertical position by action of gravity as shown in full lines Fig. 1 and dotted lines in Fig. 4. When the deflector and apron are in the position shown Fig. 1, the apron provides an inner wall for guiding the descent of objects from a superimposed drawer positioned directly above the one shown.

When the deflector and apron are moved outwardly by the action of a displaced object as shown Fig. 4, the apron forms an angular outer wall providing a proper path of descent for the object and at the same time the deflector 12 will temporarily prevent the descent of objects from a drawer above, thus avoiding collision of articles in the event two drawers are operated simultaneously.

The side view Fig. 4 shows the endless link chain conveyor 2 which consists of a staggered assembly of links 17 and 18 riveted together for hinged movement as shown Figs. 6, 7 and 8. Links 18 are designated as master links as each one of these links has an integral divider 19 which forms two walls of a compartment when in uppermost position. The divider is adapted to be engaged by a driving claw when in its lowermost position. The number of plain links 17 used between the master links 18 determine the length of the compartment for holding the particular articles or objects to be dispensed.

Both the master and plain links have a pair of hooked shaped integral offset ears 20 positioned on the under-side of each link as shown in Fig. 8. These ears are adapted to engage the inner flange 21 of a pair of rails 22 which are secured in parallel spaced relation by two spacers 23. The rails are secured to the spacers by screws 24 better shown Fig. 4. Each flange 21 is continuous and follows a semi-circle at each end thereof thus providing an endless guide over which ears 20 must follow when the link conveyor is moved. Thus it is apparent that when a load of objects "A" are retained in the upper compartments of the conveyor, the upper surface of the flange 21 provides a bearing for the load and since both projections 20 on each link are constantly engaged with the oppositely positioned flanges 21, the conveyor will conform to a path of movement described by the rails.

A cavity 25 is provided in divider 19 of each master link for intermittent engagement with a driving claw to be hereinafter described. This depression may be omitted in the event the conveyor is adapted for relatively light loads.

Each conveyor assembly is retained in the casing 1 by a pair of tie rods 26 positioned through appropriate holes in each end of all rails as shown in Figs. 4 and 11. Each rod is threaded at opposite ends and secured by nuts 27 in each side of casing 1, one of which is shown Fig. 11.

Fig. 13 illustrates the five identical actuating mechanisms for sequentially moving each of the five conveyors a distance equal to the length of each compartment in predetermined timed relation. A sub-base 28 is adapted to be secured in the rear lower portion of casing 1 as shown Fig. 4 and contains six uprights 29 secured in spaced relation on the base 28 as shown.

A cam shaft 30 journalled in the uprights 29 and bearing members 32 is adapted to operate the five actuators in equal predetermined sequence for each revolution thereof.

A pair of rods 31 and 31a positioned through coaxial holes in each upright 29 retain and position each actuating mechanism in proper position and hold each bearing 32 against which the cam shaft 30 is journalled.

Figure 14:
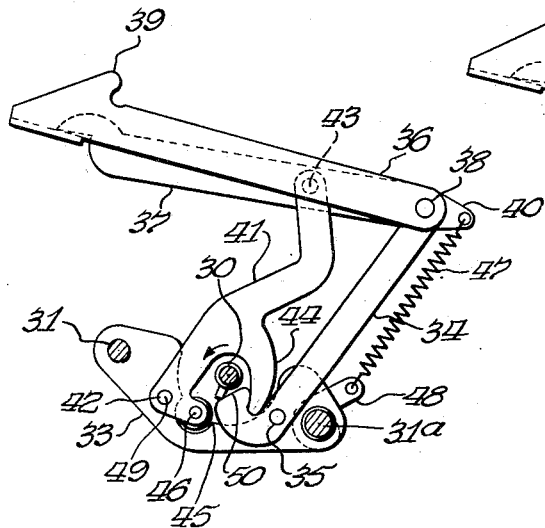
Figs. 14, 15, 16 and 17 shows one actuator, shown in Fig. 13, in four changed positions.
Figure 15:
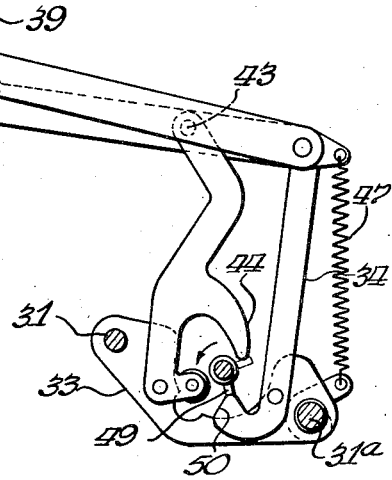

Referring to Fig. 14, each actuating mechanism is supported by a base plate 33 which in turn is retained in position by rods 31 and 31a. A fulcrum lever 34 is pivotally secured at one end to base plate 33 by rivet 35 and pivotally secured at its upper end to claw member 36 and a stroke and stop lever 37 by stud 38. The claw member 36 is channel shaped as shown in Fig. 13 and terminates in a double claw 39 at its outer end and has an integral extension 40 at its opposite end. The double claw is adapted to engage the cavity 25 in each divider 19 as shown in Fig. 7.

Referring to Figs. 13 and 14 a pair of parallel spaced second fulcrum levers 41 are pivotally secured to plate 33 by rivet 42 at their lower ends and pivotally secured to stroke lever 37 by stud 43. Each fulcrum lever 41 has a cam follower and lock projection 44 formed to engage a recess in fulcrum lever 3, as shown, when in rest position. A cam follower roller 45 is journalled between levers 41 for rotation on its axle 46 as shown. A spring 47 has one end secured to extension 40 and its opposite end secured to retainer 48 attached to rod 31a. The spring 47 normally urges the entire assembly of levers 34, 36, 37 and 41 into their inactive positions shown Fig. 14.

Each of the five actuators is operated by an individual cam 49 projecting from five spaced positions along shaft 30. Each of the cams 46 are radially positioned from each other around shaft 30 by seventy-two degrees radial spacing in order to sequentially operate the five actuators in five equally timed sequence for each revolution of the shaft.

Figure 16:
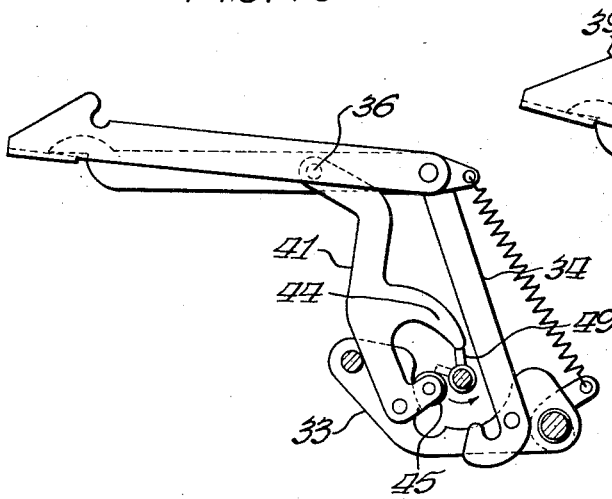
Figure 17:
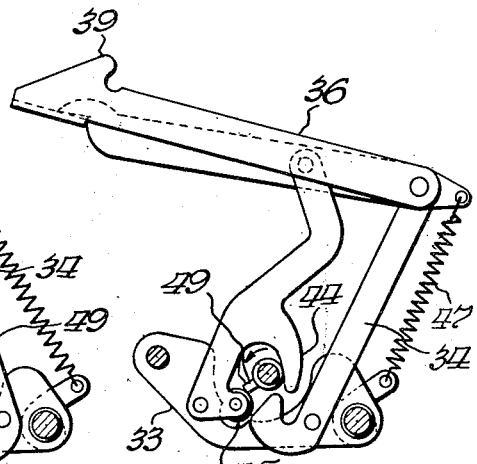

Referring to Fig. 14 cam 49 is shown in its normal rest position with a cam follower extension 50 of lever 34 in its path of movement. Figs. 14, 15, 16 and 17 illustrate four different positions assumed by the levers of the actuator for each revolution of the shaft 30. The first cycle of movement involves engagement of cam 49 with cam follower extension 50 of lever 34. Fig. 16 shows the engagement of cam 49 with projection 44 of levers 41. Fig. 17 shows the cam 49 in contact with roller 45 as the levers approach their rest position, shown Fig. 14.

The above described movements illustrate the articulation of the actuating mechanism whereby the double claw 39 will reach forward, raise and engage each master link divider 19 and to move said link and the entire conveyor through one cycle to discharge one object therefrom.

It is to be noted that the engagement of the claw 39 utilized only a small portion of the complete cycle of each actuator therefore the sequential operation of each of the five claws will complete the movement of a corresponding conveyor before the next conveyor is engaged and moved. Fig. 13 illustrates the five different positions assumed by the actuators at a given position of the cam shaft 30.

It is apparent from the foregoing that each actuator will respond successively to each revolution of shaft 30 to consecutively move each of the link conveyors 2, 3, 4, 5 and 6 to sequentially discharge therefrom objects stored thereon.

Referring to Figs. 4 and 12, an electric gear-motor 51 for driving the entire mechanism is secured to an inside vertical wall of the casing 1 as shown.

Referring to Figs. 4, 12 and 13 rotation is transmitted from the gear-motor to the shaft 30 by means of a motor drive shaft 52, a drive sprocket 53 and an endless chain 54 and driven sprocket 55 secured to shaft 30 shown in Figs. 4, 12 and 13.

A momentary type cam switch 56 is secured to the casing 1 with its operating lever 57 positioned to be responsive to a cam 58 having five equi-spaced lobes thereon secured to shaft 30. Each lobe is adapted to open switch 56.

When the motor and switch are connected in series, through a circuit not shown, to a source of electric power, the motor will operate when the switch is in closed position. Thus when the motor is momentarily started by a starting circuit not shown, the action of cam 58 and the switch 56 will hold the motor circuit closed for a sufficient period to move shaft 30 one-fifth of a revolution. The rotation of the motor and shaft 30 will be stopped by the action of each lobe of the cam 58 acting upon the switch 56.

In order to prevent movement in either direction of any of the conveyors during non-operating periods, an automatic locking mechanism is provided.

Figure 3:
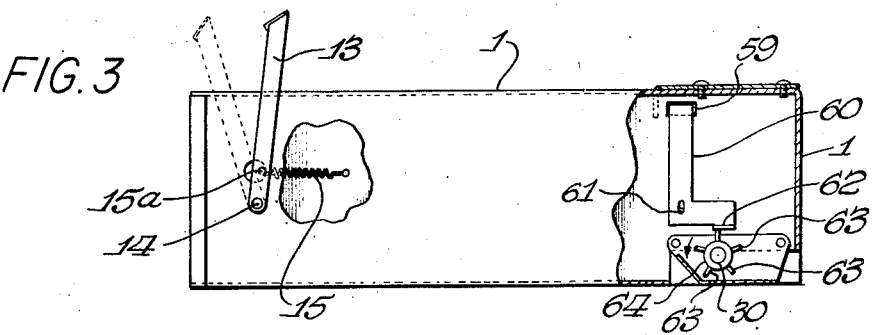
Fig. 3 is a side view of the conveyor taken through section line 3—3 Fig. 2.

Forward movement of any of the conveyors, when in rest position, is prevented by the action of a locking bar 59 transversely straddling all conveyors as shown in Figs. 3, 4, 11 and 12. This bar is supported and moved by two integral vertical slides 60 secured for vertical reciprocation to opposite sides of the inner walls of casing 1. The slides are retained in a pair of apertures through said inner walls and further supported and guided by individual shoulder rivets 61 as shown in Figs. 3 and 11.

When the locking bar is in its lowermost position, the forward flange thereof will be positioned in front of the rearmost upper divider 19 of the master link 18, thus preventing forward movement of the conveyor as shown in Fig. 4. Both vertical slides 60 are provided with camming projections 62 positioned for sequential engagement to five lifter pins 63 equi-spaced on hub 64 coaxially secured on shaft 30. Thus it is apparent that when the two hubs 64 are secured in proper timed relation to the shaft 30, the locking bar will be raised to release the conveyors for forward movement just prior to the engagement of claw lever with each conveyor for operation thereby. Immediately following the displacement of each conveyor a distance of one compartment, the locking bar will descend to secure all conveyors against further forward movement.

Reverse movement of each conveyor is prevented by individual gravity operated latches 65 supported under each conveyor on a shaft 66 secured in the casing 1 as shown in Figs. 4 and 5. It is apparent that the working ends 67 of each latch will cam over the dividers of the master links 19 when the conveyors are moved forward but the ends 67 of the latches are adapted to move upward behind each divider 19 of each master link as shown in Fig. 4, thus preventing reverse movement of each conveyor.

Referring to Figs. 1, 2 and 10, it is to be noted that the casing 1 includes partitions 68 which are positioned between each conveyor forming side walls of the delivery passages, 7, 8, 9, 10 and 11. A flat brake spring 69 is secured to opposite side walls of each delivery passageway by means of rivets 70 at the upper ends thereof and by the right angled tongue 71 normally bearing against the opposite side of each partition. Thus when an object is deposited in a given passageway by the conveyor, its descent by the action of gravity will be retarded by the combined action of the apron 16 and the brake springs 69 in order that it may be delivered to a hopper (not shown) without damage.

In operation and under the assumption that goods are placed in all compartments in all five conveyors and the electric motor and switch 56 is connected to a suitable source of power and a starting circuit is momentarily closed, then the motor will rotate shaft 30 to close the holding switch 56 and rotate shaft 30 one-fifth of a revolution. This operation will first raise locking bar 59 as previously described to be immediately followed by the operation of one of the claw levers 39 of the actuator corresponding to a link chain conveyor which will move the outermost object in said conveyor against the restraining action of the apron 16 to a position whereby the object will descend by gravity through a corresponding passageway to a place of delivery. Further cycling of the motor will sequentially operate each conveyor in sequence to deposit their corresponding foremost objects into corresponding delivery passageways.

It is to be understood from the foregoing that a mechanical means for driving the main shaft 30 may be substituted for the electric motor drive by using one of several well known intermittent movements to rotate the shaft 30 by equal increments.

Having described my invention, I claim:

1. A multiple conveyor for sequentially dispensing articles stored thereon comprising means forming a frame, a plurality of endless link chain conveyors positioned adjacent each other in said frame, each of said conveyors including a plurality of equi-spaced dividers forming compartments therein, a pair of parallel spaced endless rails in said frame for supporting and guiding each of said conveyors, each said conveyor including a plurality of engaging means slidably engaged with said rails for tracking said conveyor in a path conforming to said rails, a plurality of actuating means positioned in said frame corresponding in number to said conveyors, each of said actuators adapted to engage, move a predetermined distance and disengage from each corresponding said conveyor when operated, a shaft having a plurality of cam means thereon journalled for rotation in said frame, each of said cams adapted to sequentially operate each said actuator in a predetermined sequence for each revolution of said shaft, whereby one revolution of said shaft will sequentially move each of said conveyors to dispense therefrom a single article positioned in a predetermined said compartment in each said conveyor.

2. A multiple conveyor for sequentially dispensing articles stored thereon comprising means forming a frame, a plurality of endless link chain conveyors positioned adjacent each other in said frame, each of said conveyors including a plurality of equi-spaced dividers forming compartments therein, a pair of parallel spaced endless rails in said frame for supporting and guiding each of said conveyors, each said conveyor including a plurality of engaging means slidably engaged with said rails for tracking said conveyor in a path conforming to said rails, a plurality of actuating means positioned in said frame corresponding in number to said conveyors, each said actuator including a claw member adapted to successively engage, move and disengage each of said dividers to move said conveyor when operated, a shaft having a plurality of cam means thereon journalled for rotation in said frame, each of said cams adapted to sequentially operate each said actuator in a predetermined sequence for each revolution of said shaft whereby one revolution of said shaft will sequentially move each of said conveyors to dispense therefrom a single article positioned in a predetermined said compartment in each said conveyor.

3. A multiple conveyor for sequentially dispensing articles stored thereon comprising means forming a frame, a plurality of endless link chain conveyors positioned adjacent each other in said frame, each of said conveyors including a plurality of equi-spaced dividers forming compartments therein, a pair of parallel spaced endless rails in said frame for supporting and guiding each of said conveyors, each said conveyor including a plurality of engaging means slidably engaged with said rails for tracking said conveyor in a path conforming to said rails, a plurality of actuating means positioned in said frame corresponding in number to said conveyors, each of said actuators adapted to engage, move a predetermined distance and disengage from each corresponding said conveyor when operated, a shaft having a plurality of actuator cams thereon journalled for rotation in said frame, each of said actuator cams adapted to sequentially operate each said actuator in a predetermined sequence for each revolution of said shaft, a locking means movably secured in said frame and normally in locked position in the path of movement of said dividers of each of said conveyors, a like plurality of lifting means on said shaft for moving said locking means to unlocked position before and during the movement of each said conveyor when said shaft is rotated, whereby one revolution of said shaft will sequentially unlock and move each of said conveyors to dispense therefrom a single article positioned in a predetermined said compartment in each said conveyor.

4. A multiple conveyor for sequentially dispensing articles stored thereon comprising means forming a frame, a plurality of endless conveyors positioned adjacent each other in said frame, each of said conveyors including a plurality of equi-spaced dividers forming compartments thereon, retaining means in said frame for supporting and guiding each of said conveyors in a separate path with a like portion of each said conveyor positioned for movement in one plane, a plurality of actuating means positioned in said frame corresponding in number to said conveyors, each of said actuators adapted to sequentially engage, move a predetermined distance and disengage from each corresponding said conveyor when operated, a shaft having a plurality of cams thereon journalled for rotation in said frame, each of said cams adapted to sequentially operate each said actuator in a predetermined sequence for each revolution of said shaft, whereby one revolution of said shaft will sequentially move each of said conveyors a predetermined equal distance to dispense therefrom a single article in a predetermined said compartment in each said conveyor.

5. In a multiple conveyor for sequentially dispensing articles stored thereon comprising means forming a frame, a plurality of endless conveyors positioned adjacent each other in said frame, each of said conveyors including a plurality of equi-spaced projections extending therefrom, means in said frame for guiding each said conveyor in like paths of movement, a plurality of actuating means positioned in said frame corresponding in number and position to said conveyors, each of said actuators including a claw member adapted to successively engage, move and disengage each of said projections on its corresponding conveyor to move said corresponding conveyor a predetermined distance when operated, a cam shaft journalled for rotation in said frame, said cam shaft adapted to sequentially operate each said actuator in a predetermined sequence for each revolution of said shaft whereby one revolution of said shaft will sequentially move each of said conveyors to dispense therefrom articles retained thereon.

6. In a multiple conveyor for sequentially dispensing articles stored thereon comprising means forming a frame, a plurality of endless conveyors positioned adjacent each other in said frame, each of said conveyors including a plurality of equi-spaced projections extending therefrom, means in said frame for guiding each said conveyor in like paths of movement, a plurality of actuating means positioned in said frame corresponding in number and position to said conveyors, each of said actuators including a claw member adapted to successively engage, move and disengage each of said projections on its corresponding conveyor to move said conveyor a predetermined distance when operated, a cam shaft journalled for rotation in said frame, said cam shaft adapted to sequentially operate each said actuator in a predetermined sequence for each revolution of said shaft, an auxiliary cam on said cam shaft having a number of lobes corresponding to the number of said conveyors, an electric motor and circuit means for rotating said cam shaft when energized, an electric switch means in said frame operatively positioned in the path of movement of each of said lobes, said switch connected in said circuit means to control said motor, whereby said switch will hold said motor energized to move one of said conveyors a predetermined distance to dispense one article from one said conveyor and to a position where one of said lobes will operate said switch to de-energize said motor.

7. A conveyor adapted to intermittently move successive equal distances comprising an endless conveyor means having a plurality of equi-spaced projections extending from its outer periphery, an actuator support means positioned in fixed relation with said conveyor means, an actuator adapted for oscillatory movement on said support means for intermittently moving said conveyor means comprising a first fulcrum lever pivotly secured at at one end for movement about a first axis on said support means, said first fulcrum lever having a cam follower integral therewith adjacent said first axis and forming a lock recess therebetween, a second fulcrum lever pivotly secured to said support means at one end thereof and adapted for movement about a second axis parallel to said first axis and having an integral offset first cam follower positioned for locking engagement in said recess, said second fulcrum lever having a second cam follower offset from said second axis, a stroke lever pivotly secured to the outer end of said first fulcrum lever for movement about a third axis parallel to said second axis, said stroke lever also pivotly secured to the outer end of said second fulcrum lever for movement about a fourth axis parallel to said third axis, a claw member having a claw and a stop abutment at its outer end pivotly secured for movement about said third axis at its opposite end including an integral extension projecting outward from said third axis, spring means connecting said extension with said support means for normally urging said link work in locked position with said abutment of said claw member bearing against said stroke member, a cam journalled for rotation in said support member and positioned to successively engage and move each said cam follower, whereby one revolution of said cam shaft will operate said actuator to first move said claw member forward then to raise said member to engage said claw with one of said conveyor projections then to move said claw member and said conveyor in reverse direction and then to disengage said claw from said projection and to return said actuator to its locked rest position.

8. An actuator for intermittently engaging and moving a conveyor of the character described comprising a fixed actuator support means, a claw member adapted for oscillatory movement in four successive directions from its normal rest position, a link-work means pivotly connecting said claw member with said support member, a cam shaft journalled for rotation in said support member, said link-work means adapted for successive movement by said cam shaft when the latter is rotated whereby said claw member will move from its rest position predetermined distances upward, forward, rearward and downward to its rest position for each revolution of said cam shaft.

9. In a conveyor of the character described means forming a frame, an endless conveyor means in said casing adapted to successively discharge articles from one end thereof when operated, a passageway in said casing positioned at the said end of said conveyor for directing articles downward when discharged from said conveyor, flat spring means secured to opposite sides of said passageway for retarding articles descending in said passageway, an apron pivotly suspended by gravity in said passageway by support means journalled in said casing, spring means connecting said supports with said casing for normally urging said apron in close proximity with the said end of said conveyor, whereby the discharge of an article from the said conveyor will abut said apron and move same in said passageway against the restraining action of said spring means to permit said article to descend in said passageway in a predetermined path.

10. A conveyor for transporting a load of articles in a predetermined path comprising a trackway means consisting of a pair of rails in parallel spaced fixed relation with each other, each of said rails having a contiguous flange extending inward therefrom, an endless link chain adapted to be guided for movement in a path described by said flanges, each link of said chain comprising a load bearing portion having a pair of integral linking ears extending in parallel relation at right angles therefrom, a first pair of pivots in coaxial relation with each other in one side of both of said ears for pivotly connecting one adjacent link thereto in staggered relation, a second pair of pivots in coaxial relation with each other spaced from said first pair of pivots in both said ears for connecting the opposite adjacent link thereto in same said staggered relation, a predetermined plurality of said links having a pair of symmetrically spaced projections extending downward from said load bearing portion adapted to slidably engage each corresponding said flange whereby said link chain will be retained for slidable movement on said rails.

No references cited.